United States Patent [19]

Spritzer

[11] Patent Number: 5,025,632
[45] Date of Patent: Jun. 25, 1991

[54] METHOD AND APPARATUS FOR CRYOGENIC REMOVAL OF SOLID MATERIALS

[75] Inventor: Michael H. Spritzer, San Diego, Calif.

[73] Assignee: General Atomics, San Diego, Calif.

[21] Appl. No.: 365,667

[22] Filed: Jun. 13, 1989

[51] Int. Cl.$^5$ .............................................. F25D 17/02
[52] U.S. Cl. .......................................... 62/64; 62/303; 62/320; 241/23; 241/DIG. 37
[58] Field of Search ................... 62/303, 320, 64, 55.5; 241/23, DIG. 37

[56] References Cited

U.S. PATENT DOCUMENTS

| | | | |
|---|---|---|---|
| 4,692,982 | 9/1987 | Rice | 62/320 |
| 4,723,873 | 2/1988 | Maznyik | 62/64 |
| 4,724,677 | 2/1988 | Foster | 62/55.5 |

Primary Examiner—Ronald C. Capossela
Attorney, Agent, or Firm—Nydegger & Harshman

[57] ABSTRACT

A method and apparatus for cryogenic removal of solid materials includes a wand connected in fluid communication with a cryogen fluid source. The wand directs the cryogen against a selected portion of solid material. The wand has a spray nozzle to direct the spray against an inner exposed surface of energetic material typically contained within a munition casing. The wand is connected to a mounting element to allow movement of the wand within the munition body. The munition is mounted on a rotatable base for rotating the munition and to expose the material to the cryogenic fluid spray. The cyrogenic fluid spray, such as liquid nitrogen, is utilized in a dry washout process to freeze and embrittle the surface layer either by precooling and fluid spray, or by spray alone. The embrittle layer is then eroded away by the spray into small particles for removal by pneumatic transport, vacuum, or other collection and removal system. A mechanism may be provided for vibrating the material to loosen the particles. In addition, adjustable abrading elements may engage and remove additional amounts of embrittled material. To conserve the amount of liquid nitrogen, compressed air or gas simultaneously or in alternating succession with jets of liquid nitrogen may be utilized further to fracture and remove the embrittled particles. The probe may be made of a material to establish electrical contact between the solid material and the wand to remove static electricity from the material.

27 Claims, 2 Drawing Sheets

METHOD AND APPARATUS FOR CRYOGENIC REMOVAL OF SOLID MATERIALS

FIELD OF THE INVENTION

This invention relates generally to removal of solid materials utilizing cryogenics. More specifically, the invention relates to methods and apparatus for removal, size reduction and/or disposal of solid material using cryogenics. The present invention is particularly, though not exclusively, useful for separating solid propellant, explosive and pyrotechnic (PEP) materials from their casings and for subsequent disposal or recovery/reprocessing of the PEP material.

BACKGROUND OF THE INVENTION

The disposal of energetic materials, such as solid rocket propellants, explosives, and pyrotechnic materials (collectively referred to hereinafter as PEP materials) has been accomplished in the past by a number of different devices and procedures. For purposes of the present invention, the words "disposal" shall include the notions implied by recovery, reprocessing, size reduction and removal of PEP materials. Such materials have presented challenging disposal problems due to the diversity of their compositions, their sizes, and the sometimes intricate variations in their operational configurations. Typically, PEP materials have included a number of propellants of different compositions such as ammonium perchlorate (plus additives), single-based propellant (nitrocellulose), double-based propellant (nitrocellulose and nitroglycerin), and triple-based propellant (nitrocellulose, nitroglycerin, and nitroguanidine). PEP materials also include explosives such as the so-called plastic bonded explosives (PBX) and pyrotechnics such as white phosphorous (WP). In addition, PEP materials used as propellants for rockets, missiles, and projectiles can range from a few inches in diameter and a few pounds in weight for tactical rockets, up to ten (10) feet in diameter and several hundred thousand pounds in weight for large strategic rocket boosters. Despite such variations, however, the disposal of all PEP materials must be done safely and with consideration for such environmental factors as waste minimization, protection of surface and groundwater, and control of air contamination. As a practical matter, the disposal should be done efficiently.

Conventional ways for disposing of such inventory include open field burning and detonation. The advantage of open field burning or detonation is that the desired result can be achieved quickly using presently available technology with a minimum cost. The environmental consequences of open field burning, however, while they may be tolerable in light of other constraints, may be undesirable and even unacceptable. This may be especially so when a substantial number or amount of inventory must be destroyed.

Another conventional method for the disposal of PEP materials is the so-called high pressure water washout method which is used to remove such materials from metal casings. Unfortunately, the aqueous output stream resulting from such washout methods complicates subsequent incineration. In addition, it can contaminate the PEP materials and it can also lead to environmental contamination problems if the aqueous output stream is not properly recovered.

Another conventional method for disposing of munitions is sawing or shearing rocket motors into smaller size chunks for incineration in a rotary kiln. Unfortunately, the frictional heating which is caused by sawing or shearing is a major concern. To help alleviate this problem, frequent liquid injections are required. Such injections, however, create an aqueous stream of contaminated waste materials which must also be properly discarded. Further, such a technique has not been proven safe for all PEP materials. While to date some development work has been done to shave PEP material from the inside of a large solid rocket motor with an apple-parer type device, the risk of ignition due to frictional heating continues to be a major drawback of this process.

The present invention thus recognizes the need for removing solid material while minimizing aqueous wastes which may be hazardous and costly for disposal. In addition, the present invention recognizes that when removing solid PEP or energetic materials, sensitivity of such materials should be reduced during removal and disposal to enhance safety.

Accordingly, it is an object of the present invention to provide a method and apparatus for cryogenic removal of solid material which minimizes the amount of hazardous waste material generated. In addition, it is yet another object of the present invention to provide a method and apparatus for removing and disposing of solid PEP and energetic material in a safe and efficacious manner, with a reduced sensitivity of the PEP material to ignition during removal. It is yet another object of the present invention to provide a method and apparatus for the disposal of energetic materials which allows the removed material to be easily transported for subsequent storage or incineration. Yet another object of the present invention is to provide a method and apparatus for cryogenic removal of solid materials which is cost-effective and easy to use.

SUMMARY OF THE PRESENT INVENTION

A preferred embodiment of the device for cryogenic removal of solid materials includes a container for holding a cryogen. A wand is connected in fluid communication with the container and is movable to direct the cryogen against the surface of the material. Preferably, the cryogen is a fluid, such as liquid nitrogen, which can be sprayed from the wand and onto the surface of the PEP material to embrittle the material and reduce its sensitivity to ignition. It will be appreciated by the skilled artisan that prior to directing a cryogen onto the surface of the PEP materials, these materials may be precooled by any means well known in the pertinent art. For most PEP materials, once they have been embrittled, the force of the cryogenic jet itself is sufficient to erode the material. If, however, the jet has insufficient force to erode the materials, a compressed gas such as air or dry nitrogen may be introduced through the wand and used in addition to the cryogen. On the other hand, for precooled PEP materials, compressed gas without a constituent cryogen may be effective to erode the material. Unfortunately, a jet stream alone may be insufficient. If so, the embrittled material can be vibrated at an appropriate frequency to cause cracking and flaking. Further, a mechanical apparatus can be used to urge against the embrittled portion of the PEP materials to break the material into particles. It is to be appreciated that either vibration or mechanical fracturing can be used regardless whether the PEP materials have been cooled by a cryogenic jet or precooled by other means.

A probe is provided for the device of the present invention which establishes electrical contact between the material and the wand. With this probe, any static electricity that is generated in the material can be eliminated to prevent unwanted ignition of the material. Once the material has been size reduced, it can be disposed of by a vacuum apparatus. Also disclosed is a method for accomplishing same.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENTS

Figure 1:
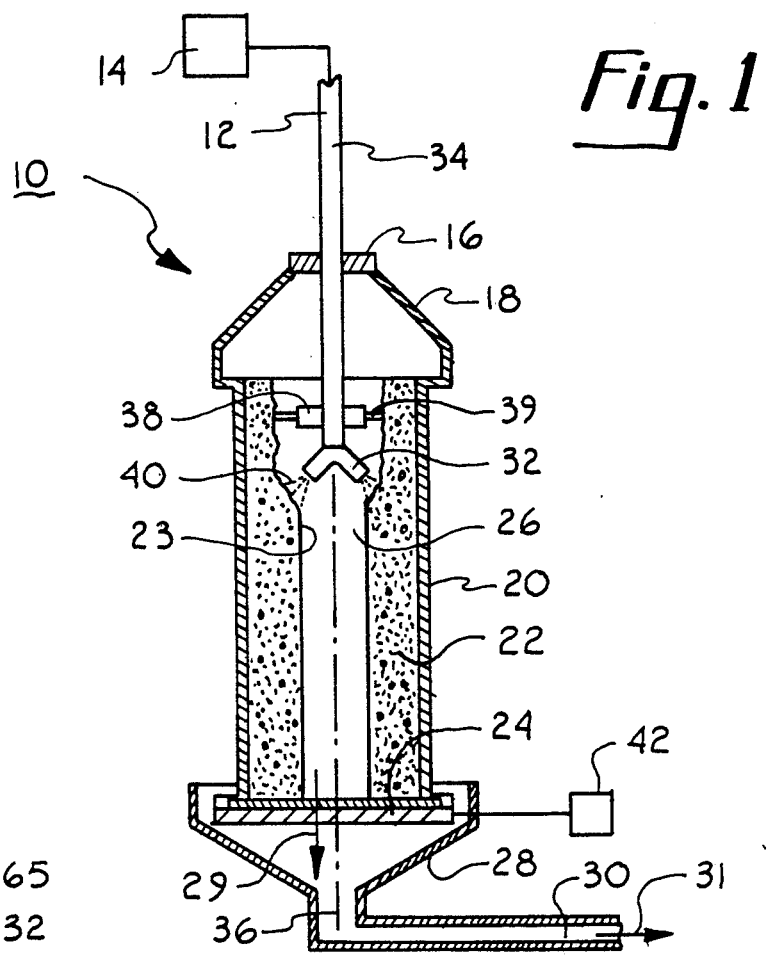
FIG. 1 is a side cross-sectional view of an apparatus for cryogenic removal of solid energetic material from a rocket motor casing in accordance with the present invention.

Referring now to FIG. 1, there is shown an apparatus for cryogenic removal of solid material generally designated as 10, shown in its intended environment. The apparatus 10 comprises a hollow spray wand 12 connected in fluid communication with a container 14, which holds a pressurized cryogenic fluid such as liquid nitrogen. Liquid nitrogen is nitrogen cooled and compressed to its liquid form at approximately $-320°$ F. Wand 12 is preferably made of an electrically conducting material, such as stainless steel alloy. Other materials suitable for making wand 12 a conductor are aluminum and copper. This allows electrical contact to be established between the material and wand 12 to remove unwanted static electricity from the material. In addition to being good conductors, these materials do not become brittle and fracture upon exposure to the low temperatures of cryogens, such as liquid nitrogen which flow through wand 12.

Spray wand 12 is coupled to a mounting element 16 for supporting wand 12. In the embodiment shown in FIG. 1, mounting element 16 is connected to a top closure 18. Top closure 18 covers the top of rocket motor casing 20 having solid PEP material 22, such as a solid propellant, encased therein. Rocket motor casing 20 is carried on rotatable turntable base 24. It will be appreciated, however, that base 24 may be held stationary while wand 12 is rotated. Solid PEP material 22 in the embodiment shown has a hollow channel 26 extending axially therethrough. Turntable 24 is rotatably mounted above a collection chamber 28. An outlet passage 30 is connected in fluid communication with collection chamber 28.

Spray wand 12 has a nozzle 32 at its distal end to establish a jet spray of gas or fluid as will be more fully described below. Nozzle 32 is connected in fluid communication by a tube 34 with cryogenic fluid container 14. Wand 12 is disposed in mounting element 16 so that it is axially translatable along axis 36 of apparatus 10. Nozzle 32 is shown in the embodiment of FIG. 1 as a pair of jet spray nozzles. However, nozzle 32 could include more or less such nozzles depending upon the pressures utilized, the PEP materials being removed, and cryogenic materials being utilized. Further, nozzle 32 may include means to extend the nozzle 32 laterally to maintain close proximity of jet spray 40 with the surface 23. There is also included one or more engaging elements 38 mounted on tube 34. Engaging elements 38 engage, scrape, or otherwise abrade PEP material 22 subsequent to its having been embrittled by the cryogenic fluid sprayed from nozzle 32, as will be more fully explained below. Engaging element 38 has a telescoping cylinder 39 which can be adjustably extended for controlling the amount of abrasion, or retracted to eliminate abrasion altogether, depending upon the particular PEP material 22. Engaging element 38 may include a roller, scraper, gas jet or other appropriate abrading element at its end to engage the PEP material 22.

As mentioned earlier, the embodiment shown in FIG. 1 is optimally for munitions which can be oriented vertically, and which have a channel 26 clear through from top to bottom. In operation, pressurized cryogenic fluid, such as liquid nitrogen is directed from cryogenic fluid container 14 into wand 12. The pressurized fluid is directed through wand 12 and out nozzle 32 against the surface layer 23 of PEP material 22, as a cryogenic fluid jet spray 40. Cryogenic jet spray 40 embrittles surface layer 23 of PEP material 22. It also cools surface layer 23 to reduce its sensitivity and prevent ignition. The surface layer 23 of PEP material 22 is thus embrittled and susceptible to fracture with relatively small applied forces. Sufficient force is then applied to fragment or spall embrittled PEP material 22 from surface layer 23. Casing 20 is rotated by turntable base 24, thus continuously exposing additional PEP material 22 to spray 40. For many solid PEP materials, the force of the cryogenic fluid jet spray 40 is itself sufficient to erode surface layer 23 of PEP material 22 to break away small eroded particles of PEP material 22. Thus, directing high pressure cryogenic jet spray 40 against PEP material 22 may suffice. As mentioned above, surface layer 23 may be precooled, by any means well known in the art, to a cryogenic temperature prior to jet spray 40 being directed onto the surface 23. In this case, it may not be necessary for jet spray 40 to have a constituent cryogen.

For some PEP materials, erosion forces of spray 40 directed from cryogenic jet nozzle 32 may be advantageously augmented by engaging element 38, which is adjustably extended radially from tube 34 to abut material 22. This assists in fracture and removal of surface layer 23 of embrittled PEP material 22.

As particles of PEP material 22 are removed from surface layer 23, munition casing 20 is slowly and continuously rotated by turntable 24, and nozzle 32 is translated axially toward the bottom of casing 20. This continuously exposes additional PEP material 22 to cryogenic jet spray 40. The eroded particles removed from embrittled surface layer 23 fall as shown by arrow 29 to the bottom of casing 20. The eroded particles are collected in collection chamber 28 for outlet via outlet passage 30 as shown by arrow 31. In addition to engaging elements 38, turntable base 24 may also be coupled to vibrating element 42 to vibrate the munition at an appropriate frequency. This causes crack propagation and flaking of frozen and embrittled surface layer 23. The eroded material particles then fall into collection chamber 28. Top closure 18 may also be vented, to vent the cryogenic gas out the top or to let air in. Alternatively, the cryogenic gas may be vented out of the bottom of casing 20, in which the vented gas may advantageously be utilized to enhance removal and transport of the waste particles.

Figure 2:
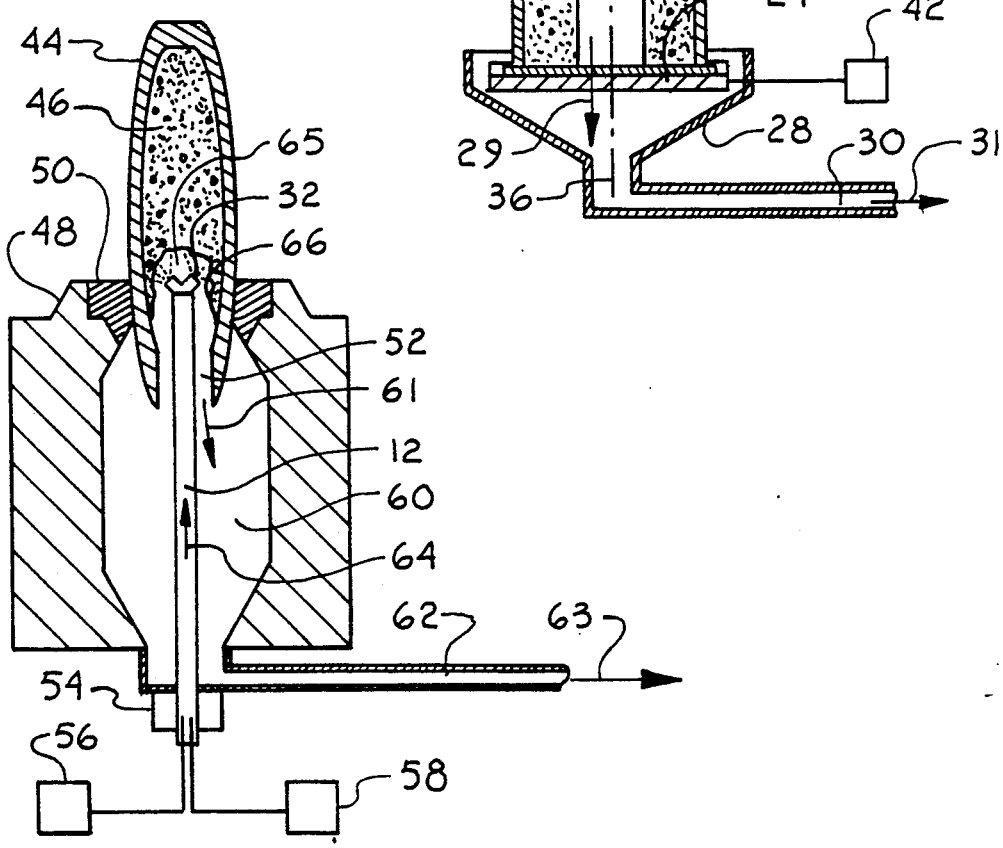
FIG. 2 is a side cross-sectional view of a preferred embodiment of the apparatus for cryogenic removal of exposed energetic material from a closed end projectile in accordance with the present invention.

Referring now to FIG. 2, there is shown an alternative embodiment of the present invention for use with a closed end munition, such as a projectile. In particular, there is shown projectile body 44 containing PEP material 46, such as a solid energetic explosive material. Projectile body 44 is vertically positioned on mounting fixture 48. Fixture 48 has rotating drive ring 50 to support projectile body 44 in a vertical position, and to rotate projectile body 44 about its longitudinal axis. Located beneath open projectile end 52 is a wand support 54 coupled to wand 12. Wand 12 has at its distal end jet spray nozzle 32. Support 54 includes a drive mechanism (not shown) for axially translating wand 12 and its nozzle 32 into projectile body 44 as solid PEP material 46 is removed. Wand 12 is connected in fluid communication with cryogen fluid source 56, which contains pressurized cryogen fluid, such as liquid nitrogen. Wand 12 is also connected in fluid communication with a high pressure gas source 58 which contains, for example, compressed air or dry nitrogen. Open projectile end 52 is situated over a collection chamber 60. Collection chamber 60 receives the particles to be removed, as well as excess gases which may collect during operation. The eroded particles and excess gases are then discharged through an outlet passage 62 connected in fluid communication with collection chamber 60.

In operation of the embodiment shown in FIG. 2, cryogenic fluid is directed from cryogen fluid source 56 through wand 12 as shown by arrow 64 out through nozzle 32 as pressurized spray 65. This cools and embrittles surface layer 66 of the PEP material 46. Predetermined amounts of cryogen fluid are necessarily introduced into wand 12 from cryogen fluid source 56, alternatingly or simultaneously with predetermined amounts of high pressure gas introduced from high pressure gas source 58. This produces a spray 65 of jets of cryogen fluid and high pressure gas which are directed against surface layer 66. The cryogen fluid embrittles layer 66, and the high pressure gas further erodes embrittled surface layer 66. This washing action takes place as projectile body 44 is rotated axially about wand 12 on rotating ring 50. Wand 12 is axially translated into projectile body 44 as PEP material 22 is thus removed. The removed particles gravitate downward as shown by arrow 61 through open projectile end 52 into collection chamber 60. The particles are removed via outlet passage 62 as indicated by arrow 63 by appropriate vacuum source (not shown).

Figure 3:
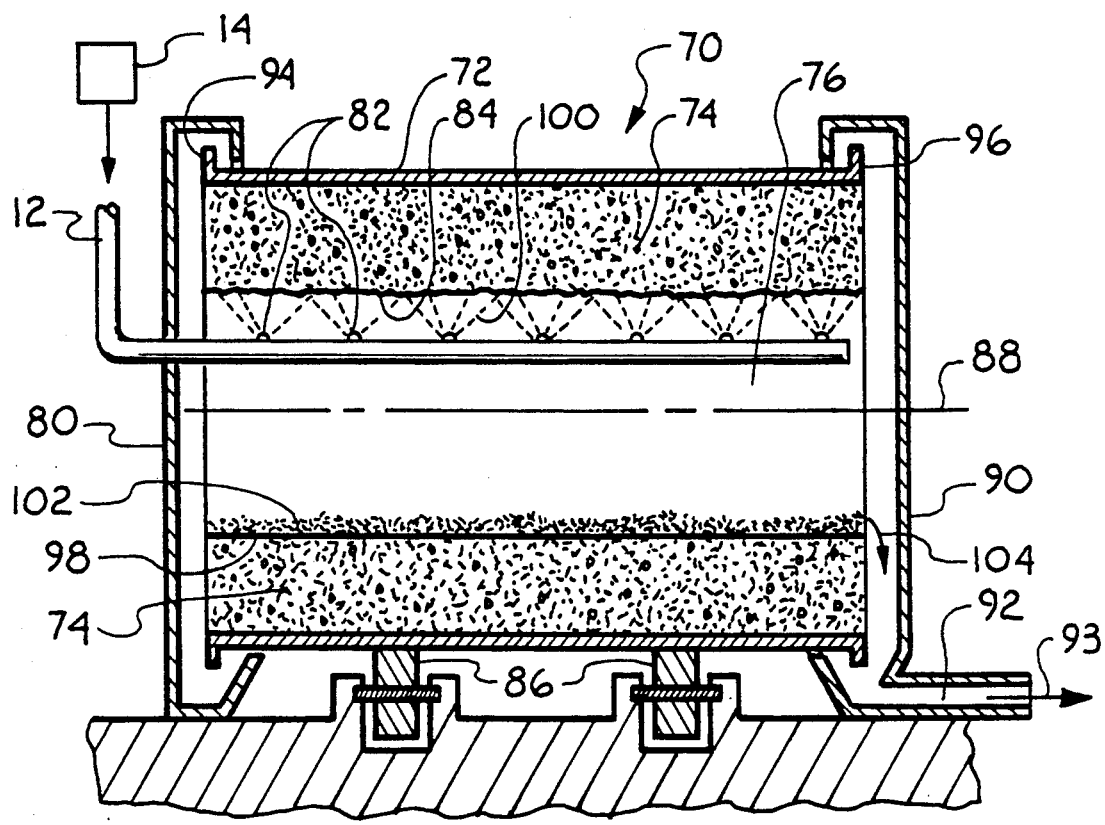
FIG. 3 is a side cross-sectional view of an alternative embodiment for removing solid energetic material from a casing in accordance with the present invention.

Referring now to FIG. 3, there is shown another embodiment of the present invention in which cylindrical munition or rocket motor 70 is oriented horizontally. In particular, munition 70 comprises cylindrical casing 72 containing solid PEP material 74, with open channel 76 extending axially therethrough. Spray wand 12 is movably mounted in a head end enclosure 80. Wand 12 extends substantially horizontally through channel 76. Wand 12 has a plurality of spray nozzles 82 arranged to spray fluid against inside exposed surface 84 of solid PEP material 74. Casing 72 is carried on a pair of rollers 86 to rotate cylindrical casing 72 about its longitudinal axis 88. A discharge end closure 90 is located at an end opposite head end enclosure 80, and collects the discharged particles for transport through outlet passage 92 as shown by arrow 93, for subsequent storage or incineration. The particles are drawn out by a vacuum source or other known mechanism (not shown). The embodiment of FIG. 3 may advantageously be adapted to larger rocket motors, in which larger amounts of cryogenic fluid are utilized. As such, it is constructed to make efficient use of the cryogenic fluid. To accomplish this, casing 72 is oriented at a slight incline in which the head end 94 of casing 72 is tilted so it is carried slightly higher than discharge end 96.

In operation, munition 70 is continuously rotated on rollers 86 so that spray wand 12 and nozzles 82 spray generally against the inner upper surface 84 of PEP material 74. As the cryogenic liquid is sprayed against inner upper surface 84, excess cryogenic liquid falls to the bottom surface 98 of PEP material 74. The cryogenic liquid thus collects on bottom surface 98 to precool solid PEP material 74 prior to its rotation for direct exposure to the cryogenic liquid spray 100 at upper surface 84. In addition, the eroded particles are gravity discharged to bottom surface 98, which further precool the PEP material 74 prior to its being embrittled by the direct spray 100. Since munition casing 72 is slightly inclined, excess cryogenic fluid and eroded particles 102, which collect on the inner bottom surface 98, move gradually down the tilted incline of bottom surface 98 and fall into the discharge end closure 90 as indicated by arrow 104. This action tends to conserve cryogenic fluid, and also effects a pre-cooling step which makes efficient use of the cryogenic fluid.

Figure 4:
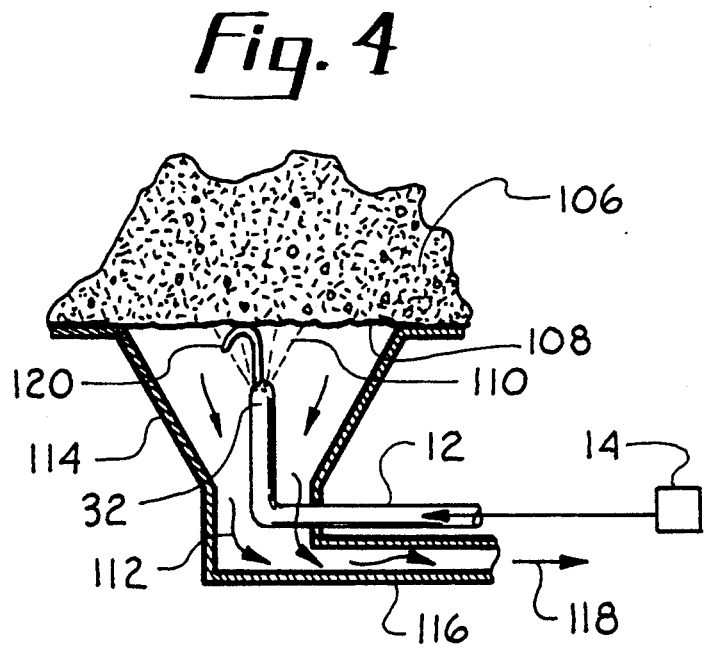
FIG. 4 is a side cross-sectional view of a portion of the apparatus for removing energetic material illustrating transport of eroded particle material for disposal in accordance with the present invention.

Shown in further detail in FIG. 4 is an embodiment of the collection and discharge portion of the present invention. In particular, the solid PEP material 106 has a surface layer 108. The jet spray 110 of cryogenic fluid is sprayed from nozzle 32 of wand 12 against surface layer 108 to embrittle and erode away surface layer 108 of PEP material 106. Spray 110 is preferably liquid nitrogen and either compressed air or dry nitrogen gas which can be sprayed simultaneously or alternatingly between the two, as described earlier. In any event, the eroded particles move generally downward in a pattern as indicated by arrows 112, and are then collected in the collection chamber 114. The eroded particles are then withdrawn by an appropriate collection mechanism, such as by pneumatic transport, vacuum source, or other mechanism (not shown), through the outlet passage 116 as shown by arrow 118.

In addition, a probe 120 is attached to nozzle 32 of wand 12. Probe 120 is made of resilient conductive material to establish and maintain electrical contact between solid propellant material 106 and wand 12. This electrical contact eliminates build up of unwanted static electricity which might cause unwanted ignition of propellant material 106. Further, probe 120 may be used to urge against material 106 to assist in its removal.

Once the PEP material 22 has been eroded from the munition, it is transported to either an incinerator for deactivation or to a storage hopper for subsequent further processing.

While the particular method and apparatus for cryogenic removal of solid materials as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A device for removing exposed energetic material from a casing which comprises:
   a container for holding a cryogen;
   a wand connected in fluid communication with said container for directing said cryogen against a selected portion of said energetic material to embrittle said portion;
   means operable with said wand for fracturing said embrittled portion into particles of said material; and
   means operable with said fracturing means for removing said particles from said casing.

2. A device for removing exposed energetic material from a casing as recited in claim 1 further comprising a mounting fixture for holding and positioning said casing.

3. A device for removing exposed energetic material from a casing as recited in claim 2 further comprising means attached to said fixture for vibrating said material to loosen said particles from the remainder of said material.

4. A device for removing exposed energetic material from a casing as recited in claim 3 wherein said vibrating means uses ultrasonic energy to loosen said particles.

5. A device for removing exposed energetic material from a casing as recited in claim 1 wherein said cryogen is liquid nitrogen.

6. A device for removing exposed energetic material from a casing as recited in claim 1 wherein said wand comprises:
   a nozzle; and
   a tube establishing a fluid passageway between said container and said nozzle.

7. A device for removing exposed energetic material from a casing as recited in claim 6 wherein said cryogen is directed through said tube for fracturing said embrittled portion.

8. A device for removing exposed energetic material from a casing as recited in claim 6 wherein said device further comprises a source of compressed gas; and said fracturing means comprises a conduit establishing a fluid passageway from said source to a means for directing compressed gas onto said material.

9. A device for removing exposed energetic material from a casing as recited in claim 8 wherein said compressed gas is air or dry nitrogen.

10. A device for removing exposed energetic material from a casing as recited in claim 1 further comprising a probe for establishing electrical contact between said material and said wand for removing static electricity from said material.

11. A device for removing exposed energetic material from a casing as recited in claim 10 wherein said wand is made of an electrically conducting material.

12. A device for removing exposed energetic material from a casing as recited in claim 1 wherein said fracturing means comprises an engager for urging against said embrittled portion to form particles of said embrittled portion.

13. A device for removing exposed energetic material from a casing as recited in claim 1 wherein said removing means is a vacuum apparatus.

14. A device for the disposal of solid materials which comprises:
   a base;
   a source of compressed gas;
   means connected with said base for cooling said material to embrittle a surface layer of said material, said cooling means comprising a container for holding a cryogen and a wand connected in fluid communication with said container for directing said cryogen onto said surface layer, said wand comprising a nozzle and a tube establishing a fluid passageway between said container and said nozzle;
   means operable with said cooling means for fracturing said surface layer to form particles of said material;
   a collection bin; and
   a conduit establishing a fluid passageway between said source of compressed gas and said nozzle and operable with said fracturing means for transporting said particles to said collection bin.

15. A device for the disposal of solid materials as recited in claim 14 wherein said cryogen is directed through said tube for fracturing said surface layer.

16. A device for the disposal of solid materials as recited in claim 14 further comprising a probe for establishing electrical contact between said material and said wand for removing static electricity from said material.

17. A device for the disposal of solid materials as recited in claim 14 wherein said fracturing means comprises an engager for urging against said surface layer to form particles of said surface layer.

18. A device for the disposal of solid materials as recited in claim 14 wherein said removing means is a vacuum apparatus.

19. A method for disposing of energetic materials which comprises the steps of:
   Cooling a surface layer of said material to embrittle said surface layer;
   removing static electricity from said cooled surface layer;
   Fracturing said surface layer to form particles of said material; and
   Transporting said particles to a collection bin for disposal.

20. A method for disposing of energetic materials as recited in claim 19 wherein said cooling step is accomplished by directing a cryogen onto said surface layer.

21. A method for disposing of energetic materials as recited in claim 19 wherein said fracturing step is accomplished by directing a compressed fluid onto said surface layer.

22. A method for disposing of energetic materials as recited in claim 19 wherein said fracturing step is accomplished by urging an engager against said embrittled surface layer to form said particles.

23. A method for disposing of energetic materials as recited in claim 19 wherein said transporting step is accomplished by vacuuming said particles from said material.

24. A method for disposing of energetic materials as recited in claim 19 wherein said cooling step is accomplished by precooling said material.

25. A method for disposing of energetic materials as recited in claim 24 wherein said cooling step is accomplished by precooling said material, and then directing a cryogen onto said surface layer.

26. A device for removing exposed solid material from a casing which comprises:

a container for holding a cryogen;

a wand connected in fluid communication with said container for directing said cryogen against a selected portion of said energetic material to desensitize and embrittle said portion;

a mounting fixture for holding and positioning said casing;

means operable with said wand for fracturing said embrittled portion into particles of said material;

means attached to said fixture for vibrating said material to loosen said particles from the remainder of said material; and means operable with said fracturing means for removing said particles from said casing.

27. A device for removing exposed solid material from a casing which comprises:

a container for holding a cryogen;

a wand connected in fluid communication with said container for directing said cryogen against a selected portion of said energetic material to embrittle said portion;

an engager operable with said wand for urging against said embrittled portion to form particles of said material; and means operable with said fracturing means for removing said particles from said casing.

* * * * *